United States Patent
Karri et al.

(10) Patent No.: US 11,899,426 B2
(45) Date of Patent: Feb. 13, 2024

(54) 3D PRINTING AND ASSEMBLY SYSTEM

(71) Applicant: INTERNATIONAL BUSINESS MACHINES CORPORATION, Armonk, NY (US)

(72) Inventors: Venkata Vara Prasad Karri, Visakhapatnam (IN); Akash U. Dhoot, Pune (IN); Shailendra Moyal, Pune (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 17/478,668

(22) Filed: Sep. 17, 2021

(65) Prior Publication Data

US 2023/0086488 A1    Mar. 23, 2023

(51) Int. Cl.
*G05B 19/4099* (2006.01)
*B25J 9/16* (2006.01)
(Continued)

(52) U.S. Cl.
CPC ........ *G05B 19/4099* (2013.01); *B25J 9/1656* (2013.01); *B29C 64/379* (2017.08);
(Continued)

(58) Field of Classification Search
CPC ............ G05B 19/4097; G05B 19/4093; G05B 2219/32099; Y02P 90/02
(Continued)

(56) References Cited

U.S. PATENT DOCUMENTS

2014/0277664 A1* 9/2014 Stump ................ B29C 33/3842
                                                    700/98
2017/0305034 A1   10/2017 Grivetti et al.
(Continued)

FOREIGN PATENT DOCUMENTS

WO    WO-2021249659 A1 * 12/2021

OTHER PUBLICATIONS

G. Neumann, "Combined 3D Printing and Part Assembly Manufacturing", Thesis for the degree of Bachelor in Computer Engineering, Universidade Federal Do Rio Grande Do Sul, Instituto De Informatica Curso De Engenharia De Computacao, Dec. 2016 (Year: 2016).*

(Continued)

*Primary Examiner* — Thomas C Lee
*Assistant Examiner* — Michael Tang
(74) *Attorney, Agent, or Firm* — CUENOT, FORSYTHE & KIM, LLC

(57) ABSTRACT

A 3D printing and assembly system includes a 3D printer having a build volume; a robotic arm configured to access both within the build volume and outside of the printer. The printing and assembly system and a 3D computer hardware system are connected to both the printer and the robotic arm. An assistive object outside of build volume and accessible by robotic arm is identified. A 3D object assembly to be generated by the printer is identified. The assistive object and the object assembly is real-time analyzed, using the computer hardware system, to generate interdependent sequential instructions for the printer and the robotic arm. The already-generated object is positioned within the build volume using the robotic arm with the sequential instructions for the robotic arm. The object assembly is 3D printed by 3D printing around the already-generated object using the sequential instructions for the 3D printer.

20 Claims, 8 Drawing Sheets

(51) Int. Cl.
B29C 64/379 (2017.01)
B29C 64/393 (2017.01)
B33Y 50/02 (2015.01)
B33Y 30/00 (2015.01)

(52) U.S. Cl.
CPC ............ *B29C 64/393* (2017.08); *B33Y 30/00* (2014.12); *B33Y 50/02* (2014.12); *G05B 2219/35134* (2013.01); *G05B 2219/45064* (2013.01); *G05B 2219/49023* (2013.01)

(58) Field of Classification Search
USPC .............................................. 700/98, 96, 119
See application file for complete search history.

(56) References Cited

U.S. PATENT DOCUMENTS

2018/0339456 A1    11/2018  Czinger et al.
2019/0243338 A1*    8/2019  Golway ................. B33Y 50/00

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

Neumann, G.H., "Combined 3D printing and part assembly manufacturing," Thesis, Universidade Federal Do Rio Grande Do Sul Instituto De Informatica, Dec. 2016, 34 pg.

"3D-Printing of magnetic materials to enable advanced design features," [online] an IP.com Prior Art Database Technical Disclosure, No. IPCOM000241303, Apr. 15, 2015, retrieved from the Internet: <https://priorart.ip.com/IPCOM/000241303>, 13 pg.

D'Aveni, R., "The 3-D Printing Revolution," [online] Harvard Business Review, May 2015, retrieved from the Internet: <https://hbr.org/2015/05/the-3-d-printing-revolution>, 13 pg.

Cassaignau, A., "3D Printing Uses: functional parts," [online] Sculpteo © 2009-2021, Aug. 26, 2015, retreived from the Internet: <https://www.sculpteo.com/blog/2015/08/26/3d-printing-uses-functional-parts/>, 9 pg.

* cited by examiner

3D PRINTING AND ASSEMBLY SYSTEM

BACKGROUND

The present invention relates to 3D printing, and more specifically, to a 3D printing system that combines both assembly and printing.

"3D" (three dimensional) printing is a relatively new technology that covers a variety of processes in which material is joined or solidified under computer control to create a three-dimensional object. A 3D object is built using a digital file generated using a computer-aided design (CAD) model, usually by successively adding material layer by layer. 3D printing differs from conventional machining processes that remove material from a stock item, or the product is created through a casting/forging process. One of the key advantages of 3D printing is the ability to produce very customized, complex shapes or geometries.

At one time 3D printing was limited to the production of aesthetic objects or functional prototypes. Now, 3D printing has matured as a viable alternative for industrial-level manufacturing of a variety of different objects. However, one of the drawbacks of 3D printing is that it is typically limited to just manufacturing an object whereas mainstream manufacturing processes integrate a whole host of different operations including in situ assembly. While 3D objects have been known to be created from multiple 3D printed components, the assembly of these components are oftentimes on an ad hoc basis outside of the confines of the 3D printer (e.g., gluing one 3D printed object to another 3D printed object). Consequently, there is a need to further extend the capabilities of 3D printing.

SUMMARY

A computer-implemented process for a 3D printing and assembly system that includes a 3D printer having a build volume; a robotic arm configured to access both within the build volume and outside of the 3D printer, wherein the 3D printing and assembly system; and a 3D computer hardware system connected to both the 3D printer and the robotic arm includes the following operations. An assistive object outside of build volume and accessible by robotic arm is identified. A 3D object assembly to be generated by the 3D printer is identified. The assistive object and the 3D object assembly is real-time analyzed, using the 3D computer hardware system, to generate sequential instructions for the 3D printer and sequential instructions for the robotic arm. The already-generated object is positioned within the build volume using the robotic arm with the sequential instructions for the robotic arm. The 3D object assembly is 3D printed by 3D printing around the already-generated object using the sequential instructions for the 3D printer. The sequential instructions for the 3D printer and the sequential instructions for the robotic arm are interdependent.

In the computer-implemented process, the 3D printer can be configured to perform 3D printing an assistive object for the 3D object assembly. The assistive object can be configured to be gripped by the robotic arm and can be configured to be removed from the 3D object assembly. Additionally, the robotic arm can be programmed to remove the assistive object from the 3D object assembly. The 3D printing and assembly system can includes a vision system configured to identify locations of the already-generated object both inside the build volume and outside the 3D printer. The already-generated object can be 3D printed or no 3D printed. The plurality of already-generated objects can be placed by the robotic arm within the 3D object assembly, and one of the plurality of already-generated objects can be positioned, within the build volume, on top of another one of the plurality of already-generated objects.

A 3D printing and assembly system includes a 3D printer having a build volume; a robotic arm configured to access both within the build volume and outside of the 3D printer, wherein the 3D printing and assembly system; and a 3D computer hardware system connected to both the 3D printer and the robotic arm. The 3D printing and assembly system is configured to perform the following operations. An assistive object outside of build volume and accessible by robotic arm is identified. A 3D object assembly to be generated by the 3D printer is identified. The assistive object and the 3D object assembly is real-time analyzed, using the 3D computer hardware system, to generate sequential instructions for the 3D printer and sequential instructions for the robotic arm. The already-generated object is positioned within the build volume using the robotic arm with the sequential instructions for the robotic arm. The 3D object assembly is 3D printed by 3D printing around the already-generated object using the sequential instructions for the 3D printer. The sequential instructions for the 3D printer and the sequential instructions for the robotic arm are interdependent.

In the 3D printing and assembly system, the 3D printer can be configured to perform 3D printing an assistive object for the 3D object assembly. The assistive object can be configured to be gripped by the robotic arm and can be configured to be removed from the 3D object assembly. Additionally, the robotic arm can be programmed to remove the assistive object from the 3D object assembly. The 3D printing and assembly system can includes a vision system configured to identify locations of the already-generated object both inside the build volume and outside the 3D printer. The already-generated object can be 3D printed or no 3D printed. The plurality of already-generated objects can be placed by the robotic arm within the 3D object assembly, and one of the plurality of already-generated objects can be positioned, within the build volume, on top of another one of the plurality of already-generated objects.

A computer program product includes computer readable storage medium having stored therein program code. The program code, which when executed by a 3D printing and assembly system that includes a 3D printer having a build volume; a robotic arm configured to access both within the build volume and outside of the 3D printer, wherein the 3D printing and assembly system; and a 3D computer hardware system connected to both the 3D printer and the robotic arm includes the following operations, causes the 3D printing and assembly system to perform the following operations. An assistive object outside of build volume and accessible by robotic arm is identified. A 3D object assembly to be generated by the 3D printer is identified. The assistive object and the 3D object assembly is real-time analyzed, using the 3D computer hardware system, to generate sequential instructions for the 3D printer and sequential instructions for the robotic arm. The already-generated object is positioned within the build volume using the robotic arm with the sequential instructions for the robotic arm. The 3D object assembly is 3D printed by 3D printing around the already-generated object using the sequential instructions for the 3D printer. The sequential instructions for the 3D printer and the sequential instructions for the robotic arm are interdependent.

With the computer program product, the 3D printer can be configured to perform 3D printing an assistive object for the 3D object assembly. The assistive object can be configured to be gripped by the robotic arm and can be configured to be removed from the 3D object assembly. Additionally, the robotic arm can be programmed to remove the assistive object from the 3D object assembly. The 3D printing and assembly system can includes a vision system configured to identify locations of the already-generated object both inside the build volume and outside the 3D printer. The already-generated object can be 3D printed or no 3D printed. The plurality of already-generated objects can be placed by the robotic arm within the 3D object assembly, and one of the plurality of already-generated objects can be positioned, within the build volume, on top of another one of the plurality of already-generated objects.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
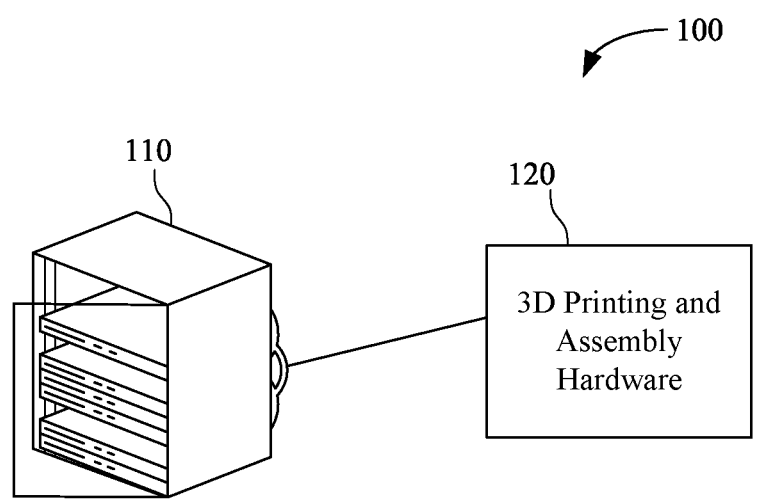
FIG. 1 is a block diagram illustrating an example architecture of a 3D printing and assembly system according to an embodiment of the present invention.
Figure 2:
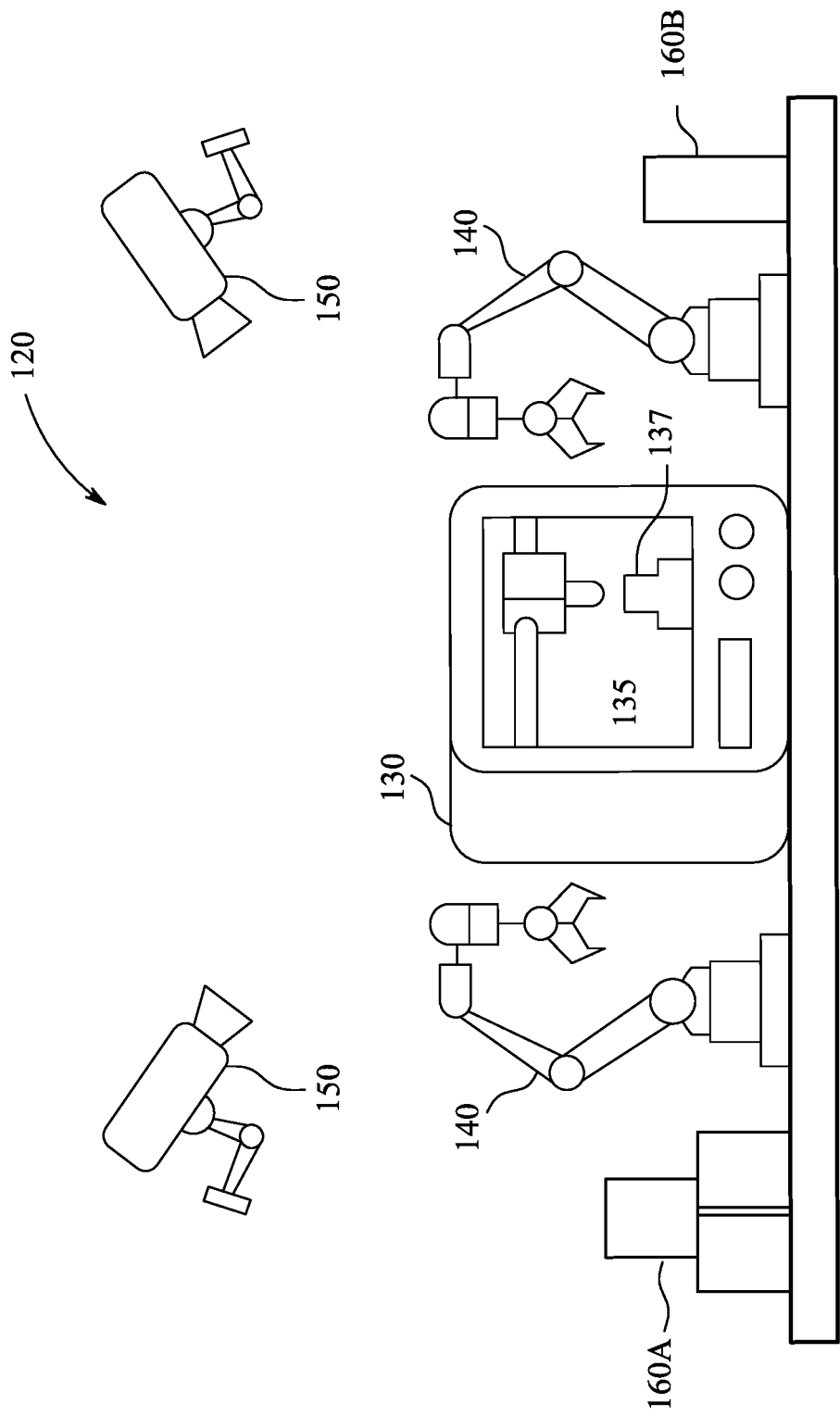
FIG. 2 is a block diagram illustrating further details of the 3D printing and assembly system illustrated in FIG. 1.
Figure 3:
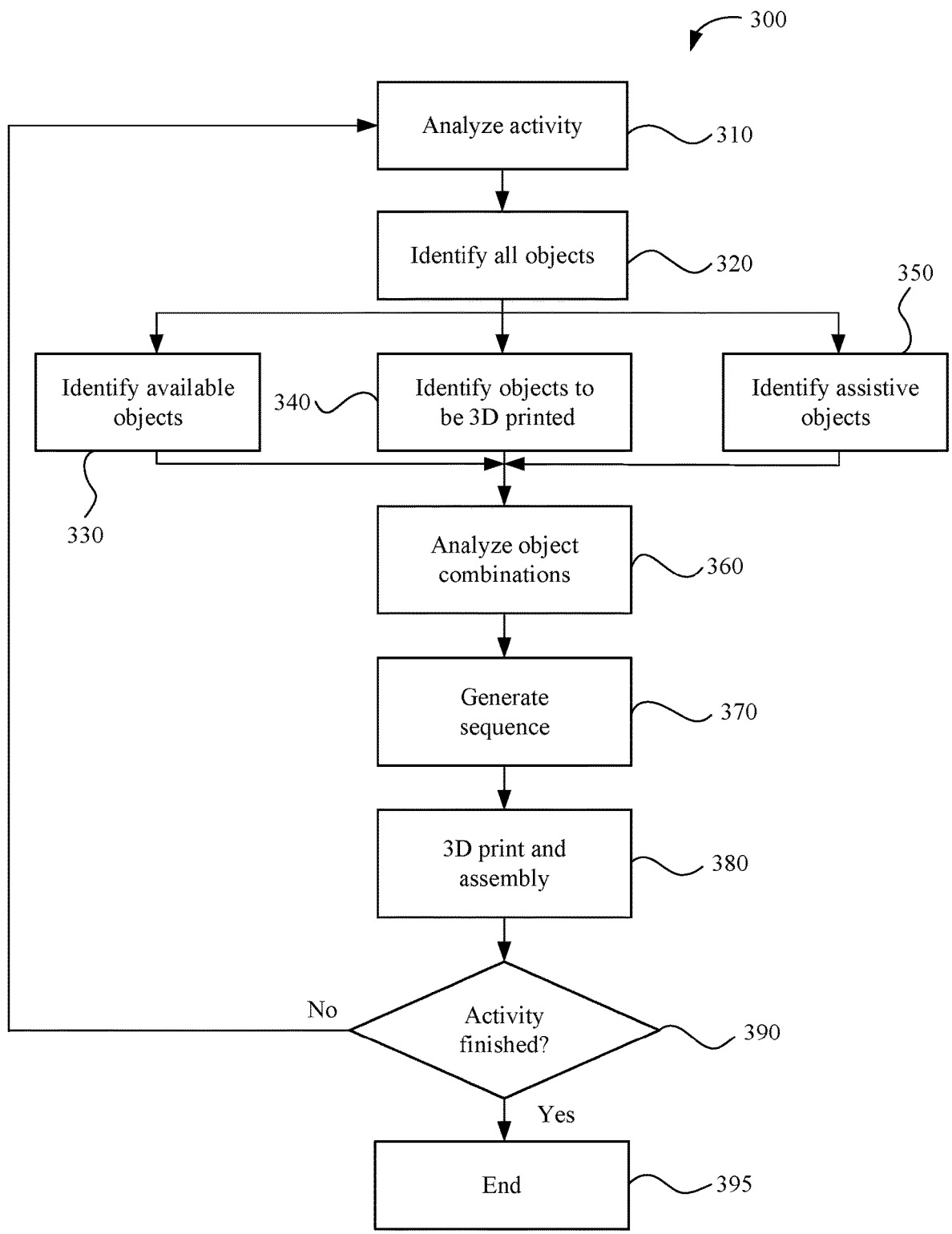
FIG. 3 illustrates an example method using the architecture of FIGS. 1 and 2 according to an embodiment of the present invention.
Figure 4:
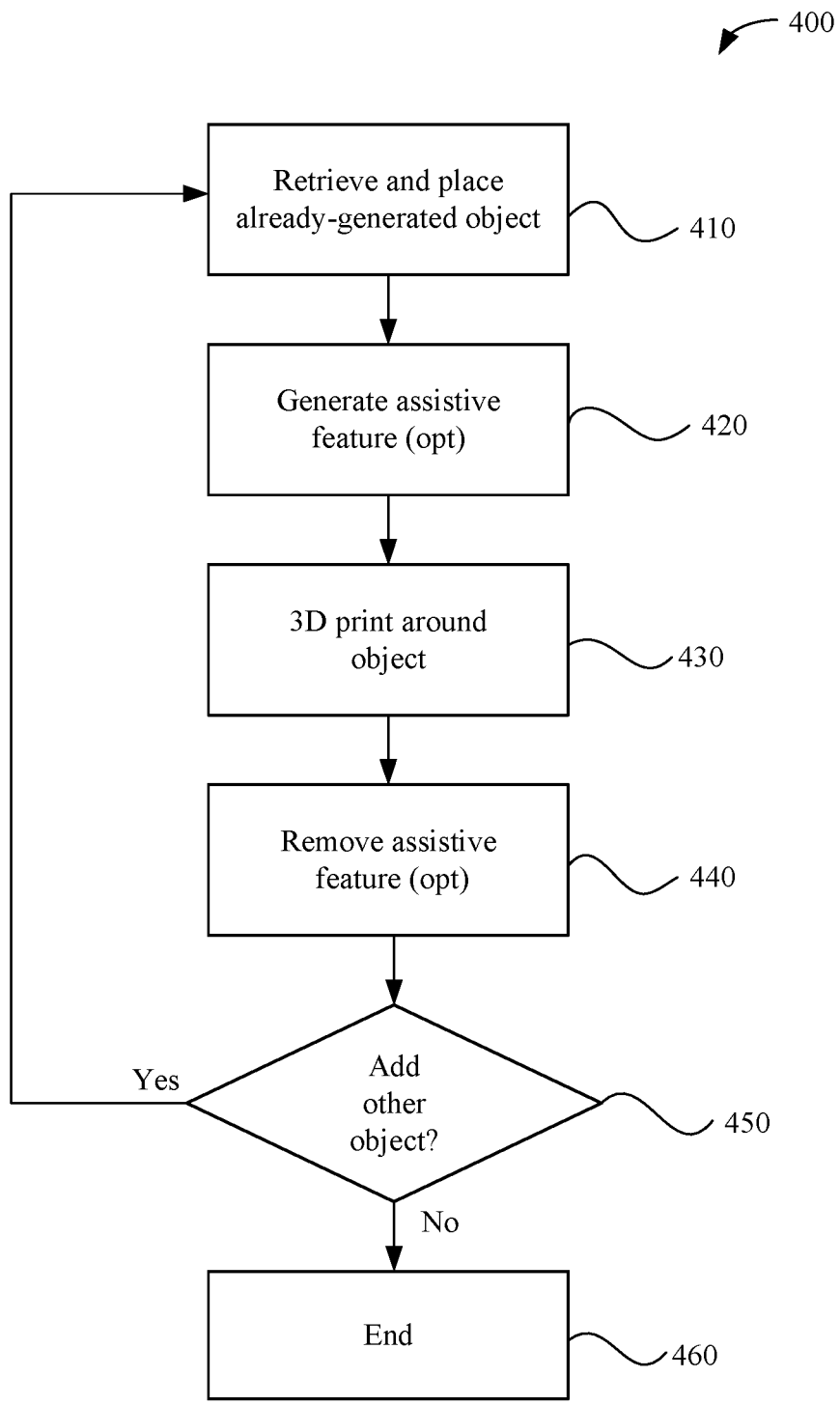
FIG. 4 illustrates an example method describing further details of generating an assistive object according to an embodiment of the present invention.

Reference is made to FIGS. 2-4, which illustrate a 3D printing and assembly system 100 and methodology 300. Referring to FIG. 1, the 3D printing and assembly system 100 includes a 3D computer hardware system 110 and 3D printing and assembly hardware 120. Further aspects of the 3D printing and assembly hardware 120 are illustrated in FIG. 2, which illustrates a 3D printer 130 and at least one robotic arm 140 used for assembly of 3D objects.

Although a single 3D printer 130 is disclosed, the present 3D printing and assembly hardware 120 is not limited in this manner as multiple 3D printers 130 could be employed. Additionally, the 3D printing and assembly hardware 120 is not limited as to a type of 3D printer technology (e.g., stereolithography, digital light processing, fused deposition modeling, selective laser sintering, selective laser melting, electronic beam melting, laminated object manufacturing) being employed. However, the build volume 135 of the 3D printer 130 should be capable of being accessed by the one or more robotic arms 140.

Robotic arms 140 are well known in the art, and the present 3D printing and assembly hardware 120 is not limited as to a particular type of robotic arm 140. In certain aspects, the robotic arm 140 is positioned at a known positive relative to the 3D printer 130 and the build volume 135 of the 3D printer 130 to facilitate movement of objects 137, 160A, 160B by the robotic arm 140 to, from, and within the 3D printer 130. Depending upon the particular object being printed/manipulated, the robotic arm 140 includes a gripper (also known as a hand) configured to grip the object. Additionally, the robotic arm 140 is configured to grip objects that are positioned within the build volume 135 of the 3D printer 130.

The 3D printing and assembly hardware 120 can optionally include a vision system 150 comprised of one or more cameras. Vision systems 150 are well known in the art, and the present 3D printing and assembly hardware 120 is not limited as to a particular type of vision system 150. The vision system 150 can be used to identify the position of an object 137 within the 3D printer 130 as well as objects 160A, 160B outside of the 3D printer 130. Additionally, the vision system 150 can identify the position of the robotic arm 140 relative to the 3D printer 130 and the objects 160A, 160B. Although shown as being separate from the 3D printer 130 and the robotic arm 140, some or all of the portions of the vision system 150 can be built into either the 3D printer 130 and/or the robotic arm 140.

A 3D computer hardware system 110 is connected to the 3D printing and assembly hardware 120. Although shown as a single monolith system, the 3D computer hardware system 110 can be comprised of multiple individual computer systems that are networked together. In operation, the 3D computer hardware system 110 controls the operations of the individual components of the 3D computer hardware system 110 and performs many of the analysis described in conjunction with FIG. 4.

Referring to FIG. 4, operations 300 of the 3D printing and assembly system 100 are disclosed. In 310, the operations 300 can begin with the identification of an activity to be performed. As used herein, the term "activity" refers to the creation of a 3D assembly comprised of a plurality of sub-assemblies (also referred to herein as an object or 3D object). While conventional 3D objects are typically generated piecemeal and assembled outside of the 3D printer 130, the present disclosure contemplates the in situ creation, within the 3D printer 130, of a 3D object assembly that is comprised of one or more 3D printed objects.

In 320, all objects that make up the 3D object assembly are identified. Identifying components of an object to be manufactured is well known in the art, and the 3D printing and assembly system 100 can employ any number of these known methodologies. For example, a CAD drawing of the 3D object assembly can be broken down by the 3D computer hardware system 110 into individual components. However, the present the 3D printing and assembly system 100 expands upon conventional methodologies by breaking down this process into three separate operations.

In 330, the 3D computer hardware system 110 is configured to identify already-created objects 160A, 160B that can be accessed by the robotic arm 140. The identification of the already-created objects 160A, 160B can include identifying one or more of the type, amount, and placement of these objects 160A, 160B. These already-created objects 160A, 160B can be 3D printed objects, non-3D printed objects, or a combination of the two. For example, a different 3D printing and assembly system (not shown) may provide the objects 160A, 160B for the 3D printing and assembly system 100. In certain aspects, this different 3D printing and assembly system can be positioned adjacent the 3D printing and assembly system 100 such that a robotic arm (not shown) of this different 3D printing and assembly system can place the objects 160A, 160B within reach of the robotic arm 140 of the 3D printing and assembly system 100. Although the 3D computer hardware system 110 is not limited as to how the already-created objects 160A, 160B that can be accessed by the robotic arm 140 are identified, in certain aspects, these objects 160A, 160B can be identified using the vision system 150.

In 340, the 3D computer hardware system 110 is configured to identify portions 137 of the 3D object assembly that will be 3D printed by the 3D printer 130. These portions 137 would be additive to the already-created objects 160A, 160B that will be used to create the 3D object assembly. Again, the 3D computer hardware system 110 is not limited as to how the portion(s) 137 of the 3D object assembly that will be 3D printed by the 3D printer 130 are identified. For example, the 3D computer hardware 100 can perform a reductive analysis that looks at both the 3D object assembly and the already-created objects 160A, 160B to identify the portion(s) 137 to be 3D printed.

Figure 5:
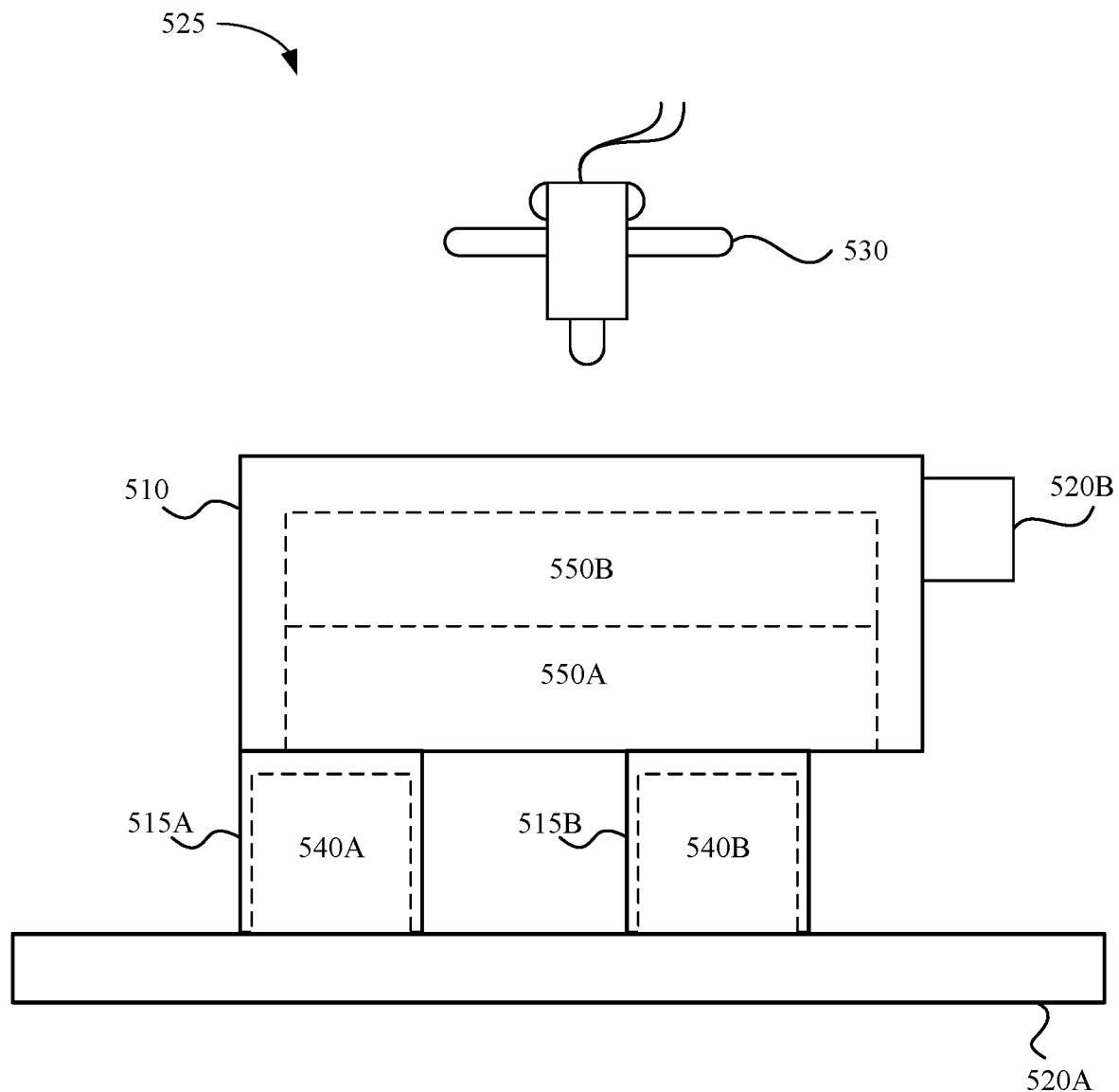
FIG. 5 is a block diagram of an assistive object generated using the methodology of FIG. 4.

In 350, the 3D computer hardware system 110 is configured to identify optional assistive elements (e.g., 520A, 520B illustrated in FIG. 5). These assistive elements 520A, 520B can be, for example, a temporary support 520A used to support the generation the 3D object 510, as is well-known in the art. Additional, an assistive element can be a grip 520B with which the robotic arm 140 can use to manipulate the object 510. Yet again, the 3D computer hardware system 110 is not limited as to how the assistive elements 520A, 520B are identified. For example, the 3D computer hardware 100 can use known 3D printing software to automatically generate the support 520A. Additionally, the 3D computer hardware 100 may determine that the 3D object 510 is incapable of being properly gripped/manipulated by the robotic arm 140 and create a grip 520B configured to be gripped by the gripper/hand of the robotic arm 140. These assistive elements 520A, 520B can be configured to be easily removed from the 3D object 510, as is known in the art. For example, a different printing material may be used to create the assistive elements 520A, 520B.

In 360, the 3D computer hardware system 110 analyzes the 3D object assembly to be generated in conjunction with the already-created objects 160A, 160B. For example, the 3D computer hardware system 110 can identify what combinations of the already-created objects 160A, 160B, that can be used (e.g., as a filler) as part of the 3D object assembly, which can advantageously faster generate the 3D object assembly by, for example, reducing an amount of 3D printing activity/material. This would involve, for example, determining whether the 3D shape of the already-created object(s) 160A, 160B can fit within the shape of the 3D object assembly (e.g., by having smaller dimensions than the 3D object assembly) and what alignment is required for this to occur. In addition to or alternatively, the already-created object 160A, 160B may have a specific known function that is required at a specific location of the 3D object assembly, and the 3D computer hardware system 110 can determine how the 3D object assembly can be generated based upon having the already-created object 160A, 160B at that particular location.

The 3D computer hardware system 110 can also use the information obtained in operations 330, 340, 350 (e.g., the 3D model as well as the information regarding the already-created objects 160A, 160B) as well as information obtained by the vision system 150 to perform a structural analysis (e.g., force components) on the 3D assembly. For example, based upon the assembly needed, the 3D computer hardware system 110 may determine that one or more assistive elements 520A, 520B are needed for effective assembly.

In 370, based upon the analysis performed in 360, a sequence of printing/assembly operations can be generated, in real-time, by the 3D computer hardware system 110. These operations direct how the robotic arm(s) 140 are to operate as well as what assistive features 520A, 520B are needed to be generated. The operations will also describe how the 3D object is to be printed. Creating 3D printing sequential instructions for a particular shape for the 3D printer 130 is known to those skilled in the art, and the 3D printing and assembly system 100 is not limited in the manner in which the sequence of printing operations are generated. Additionally, the creation of sequential instructions the movement/actions of a robotic arm 140 are also known to those skilled in the art, and the 3D printing and assembly system 100 is not limited in the manner in which the sequence of robotic arm operations are generated. Additionally, the sequential instructions for the 3D printer 130 and the sequential instructions for the robotic arm 140 are interdependent such that the timing of particular instruction(s) within both sets of sequential instructions having a timing relationship (e.g., a particular operation of the robotic arm 140 necessarily precedes a particular operation of the 3D printer 130 or vice versa).

In 380, the 3D printing and assembly is performed consistent with the sequence of printing/assembly operations identified in 370. The operations of 380 are discussed in more detail in FIG. 4. Although illustrated as being performed sequential, two or more of 360, 370, and 380 can be performed in parallel In 390, the 3D computer hardware system 110 makes a determination whether the activity is finished. For example, a particular 3D object to be assembled may be comprised of multiple 3D object assemblies. In this instance, each of the constituent 3D object assemblies may be generated using the methodology 300 of FIG. 3. Consequently, the creation of the 3D object assembly that is itself comprised of multiple 3D object assemblies may be assembled using multiple iterations of the methodology 300.

As another example, multiple copies of the 3D object assembly may be generated, in which case the methodology 300 can be performed for each 3D object assembly being assembled. While FIG. 3 illustrated the methodology 300 starting at operation 310, the methodology 300 is not limited in this manner. For example, in the example just discussed, the analyzing the activity 310 need not be performed again. However, since the assembly of the prior 3D object assembly may have used one of the already-created objects 160A, 160B, a new determination as to the type/number of already-created objects 160A, 160B may have to be repeated. Once the activity is finished, the methodology 300 ends at operation 395.

Referring to FIG. 4, a methodology 400 for the actual 3D printing and assembly of operation 380 in FIG. 3 is disclosed. While FIG. 4 illustrates operation 420 following operation 410, this order can be reversed depending upon whether the generation 420 of the (optional) assistive feature 520B is needed prior to the placement of the already-generated object 160A, 160B within the build volume 135 of the 3D printer 130. In 410, the robotic arm 140 retrieves the already-generated object 160A, 160B and places the already-generated object 160A, 160B within the build volume 135. In 420, the assistive feature 420 is generated by the 3D printer 130.

In 430, the 3D object is printed around the already-generated object 160A, 160B. For example reference is made to FIG. 5, which illustrated an object assembly 510 being generated with multiple already-generated objects 540A, 540B and 550A, 550B. During the actual 3D printing and assembly, the 3D computer hardware 100 can analyze the shape of the object and place one or more already-generated objects 540A, 540B and 550A, 550B in the build volume 525. For example, the legs 515A, 515B of the object assembly 510 can be formed by first placing assistive objects 540A, 540B (illustrated in dashed lines) in the build volume 525 around which the 3D Nozzle 530 can print the remainder of the legs 515A, 515B. As further illustrated, additional assistive objects 550A, 550B can be stacked on top of the partially-generated object assembly 510 and/or one another. In this manner, the amount of 3D printing can be reduced.

In 440, the assistive feature 420 can optionally be removed. Although not limited in this manner, the robotic arm 140 (or a combination of robotic arms 140) can be used to remove the assistive feature 420. The timing of the removal of the assistive feature 420 is also not limited in a particular manner. For example, the assistive feature 420 may be removed immediately after the 3D object is printed around the already-generated object 160A, 160B or the assistive feature 420 may be removed after multiple printings.

In 450, a determination is made whether an additional already-generated object 160A, 160B is to be added to the 3D printed object. If so, the methodology 400 loops back to operation 410. Once all printing, assembly, and removal is finished, the methodology 400 ends at operation 460.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
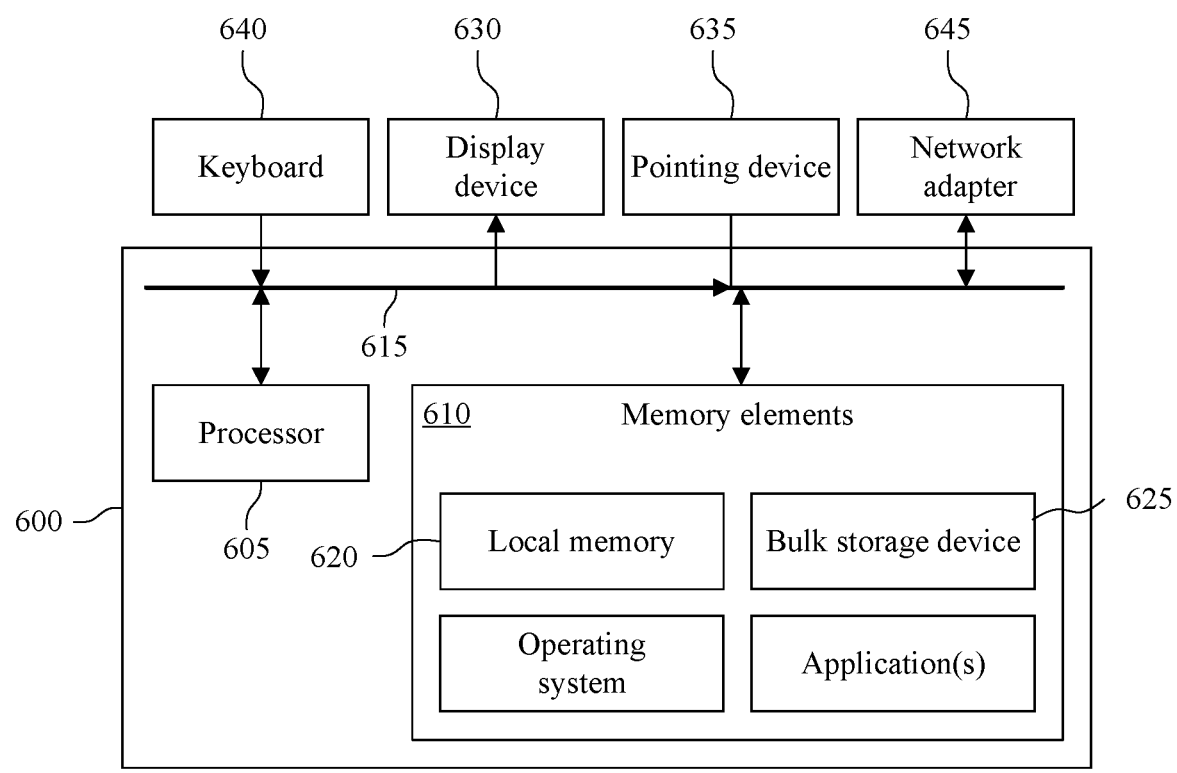
FIG. 6 is a block diagram illustrating an example of computer hardware system for implementing the 3D computer hardware system of FIG. 1.

FIG. 6 is a block diagram illustrating example data processing system 600 for serving as the 3D computer hardware system 110. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a graphics processing unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the 3D computer hardware system 110 of FIG. 1. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
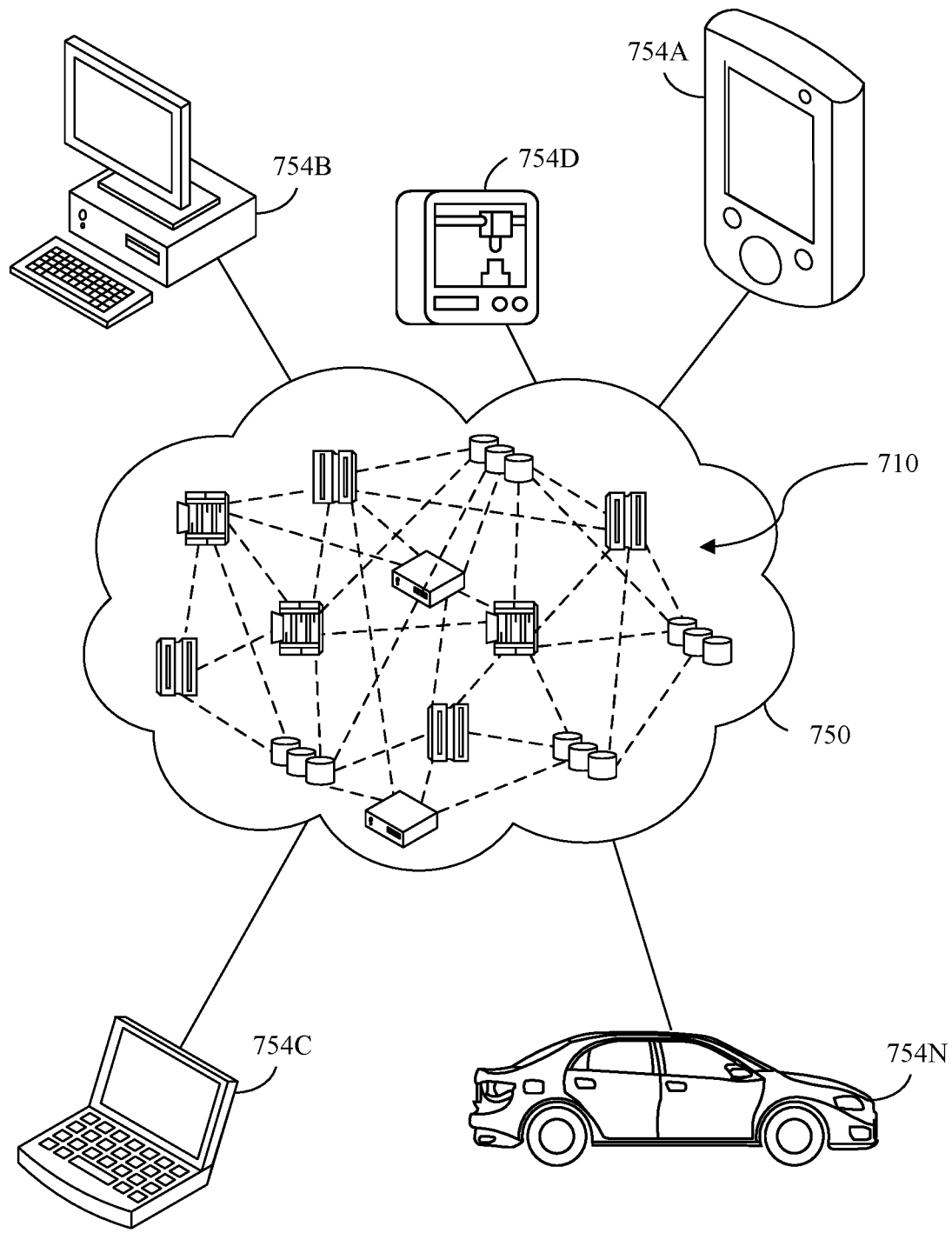
FIG. 7 depicts a cloud computing environment according to an embodiment of the present invention.

Referring now to FIG. 7, illustrative cloud computing environment 750 to be used with the 3D printing and assembly system 100 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, 3D printing and assembly hardware 754D, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
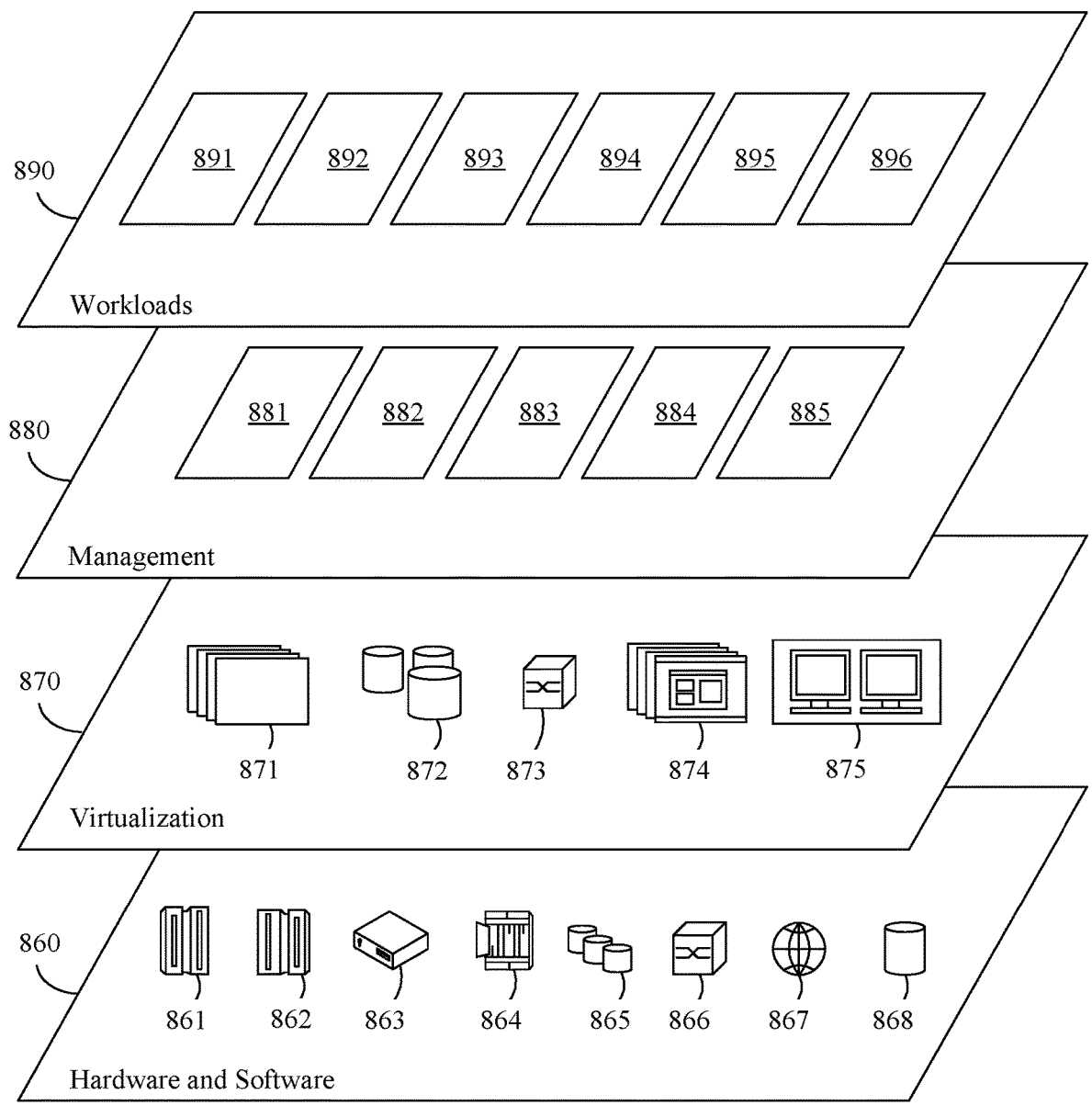
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the 3D printing and assembly system 100.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process for a 3D printing and assembly system including a 3D computer hardware system, a robotic arm and a 3D printer having a build volume, comprising:
   identifying, by a vision system, an already-generated object positioned outside of the build volume and accessible by the robotic arm;
   identifying a 3D object assembly to be generated by the 3D printer;
   real-time analyzing, using the 3D computer hardware system, a combination of the already-generated object and the 3D object assembly to generate sequential instructions for the 3D printer and sequential instructions for the robotic arm;
   positioning, within the build volume, the already-generated object using the robotic arm with the sequential instructions for the robotic arm; and
   3D printing around the already-generated object using the 3D printer with the sequential instructions for the 3D printer to generate the 3D object assembly, wherein
   the sequential instructions for the 3D printer and the sequential instructions for the robotic arm are interdependent, and
   the robotic arm is separate from the 3D printer and is configured to access both within the build volume and outside of the 3D printer.

2. The process of claim 1, further comprising
3D printing an assistive object for the 3D object assembly.

3. The process of claim 2, wherein
the assistive object is configured to be gripped by the robotic arm.

4. The process of claim 2, wherein
the assistive object is configured to be removed from the 3D object assembly, and
the robotic arm is programmed to remove the assistive object from the 3D object assembly.

5. The process of claim 1, wherein
the 3D printing and assembly system includes the vision system that is configured to identify locations of the already-generated object both inside the build volume and outside the 3D printer.

6. The process of claim 1, wherein
the already-generated object is not 3D printed.

7. The process of claim 1, wherein
a plurality of already-generated objects are placed by the robotic arm within the 3D object assembly.

8. The process of claim 7, wherein
one of the plurality of already-generated objects is positioned, within the build volume, on top of another one of the plurality of already-generated objects.

9. A 3D printing and assembly system, comprising:
a 3D printer having a build volume;
a robotic arm separate from the 3D printer and configured to access both within the build volume and outside of the 3D printer; and
a 3D computer hardware system connected to both the 3D printer and the robotic arm, wherein
the 3D printing and assembly system is configured to perform:
    identifying, by a vision system, an already-generated object positioned outside of the build volume and accessible by the robotic arm;
    identifying a 3D object assembly to be generated by the 3D printer;
    real-time analyzing, using the 3D computer hardware system, a combination of the already-generated object and the 3D object assembly to generate sequential instructions for the 3D printer and sequential instructions for the robotic arm;
    positioning, within the build volume, the already-generated object using the robotic arm with the sequential instructions for the robotic arm; and
    3D printing around the already-generated object using the 3D printer with the sequential instructions for the 3D printer to generate the 3D object assembly, wherein
the sequential instructions for the 3D printer and the sequential instructions for the robotic arm are interdependent.

10. The 3D printing and assembly system of claim 9, wherein the 3D printer is configured to perform
3D printing an assistive object for the 3D object assembly.

11. The 3D printing and assembly system of claim 10, wherein
the assistive object is configured to be gripped by the robotic arm.

12. The 3D printing and assembly system of claim 10, wherein
the assistive object is configured to be removed from the 3D object assembly, and
the robotic arm is programmed to remove the assistive object from the 3D object assembly.

13. The 3D printing and assembly system of claim 9, wherein
the 3D printing and assembly system includes the vision system that is configured to identify locations of the already-generated object both inside the build volume and outside the 3D printer.

14. The 3D printing and assembly system of claim 9, wherein
the already-generated object is not 3D printed.

15. The 3D printing and assembly system of claim 9, wherein
a plurality of already-generated objects are placed by the robotic arm within the 3D object assembly.

16. The 3D printing and assembly system of claim 15, wherein
one of the plurality of already-generated objects is positioned, within the build volume, on top of another one of the plurality of already-generated objects.

17. A computer program product for a 3D printing and assembly system including a 3D computer hardware system, a robotic arm and a 3D printer having a build volume, comprising:
a computer readable storage medium having stored therein program code,
the program code, which when executed by the 3D printing and assembly system, causes the 3D printing and assembly system to perform:
    identifying, by a vision system, an already-generated object positioned outside of the build volume and accessible by the robotic arm;
    identifying a 3D object assembly to be generated by the 3D printer;
    real-time analyzing, using the 3D computer hardware system, a combination of the already-generated object and the 3D object assembly to generate sequential instructions for the 3D printer and sequential instructions for the robotic arm;
    positioning, within the build volume, the already-generated object using the robotic arm with the sequential instructions for the robotic arm; and
    3D printing around the already-generated object using the 3D printer with the sequential instructions for the 3D printer to generate the 3D object assembly, wherein
the sequential instructions for the 3D printer and the sequential instructions for the robotic arm are interdependent, and
the robotic arm is separate from the 3D printer and is configured to access both within the build volume and outside of the 3D printer.

18. The computer program product of claim 17, wherein the 3D printer is configured to perform
3D printing an assistive object for the 3D object assembly,
the assistive object is configured to be gripped by the robotic arm,
the assistive object is configured to be removed from the 3D object assembly, and
the robotic arm is programmed to remove the assistive object from the 3D object assembly.

19. The computer program product of of claim 17, wherein
the 3D printing and assembly system includes the vision system that is configured to identify locations of the already-generated object both inside the build volume and outside the 3D printer.

20. The computer program product of of claim 17, wherein
the already-generated object is not 3D printed,
a plurality of already-generated objects are placed by the robotic arm within the 3D object assembly, and
one of the plurality of already-generated objects is positioned, within the build volume, on top of another one of the plurality of already-generated objects.

* * * * *